Patented Mar. 12, 1929.

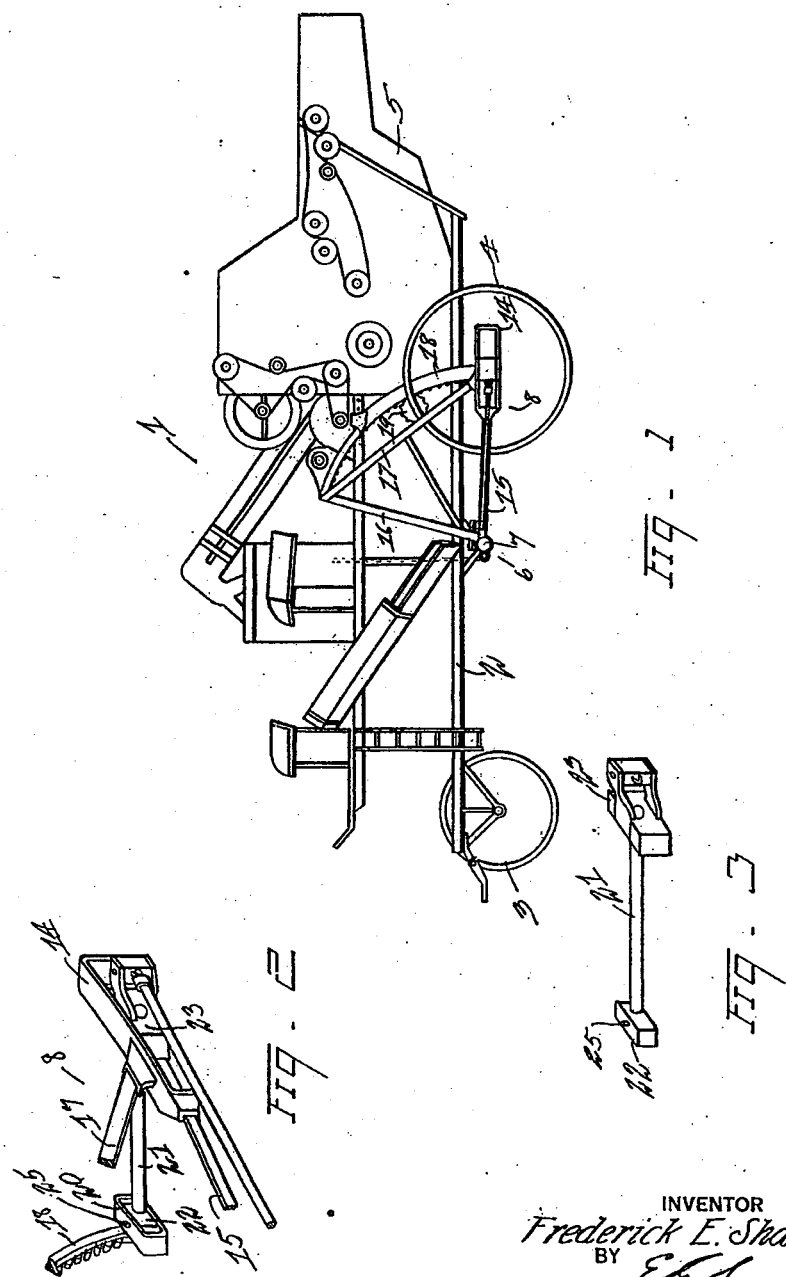

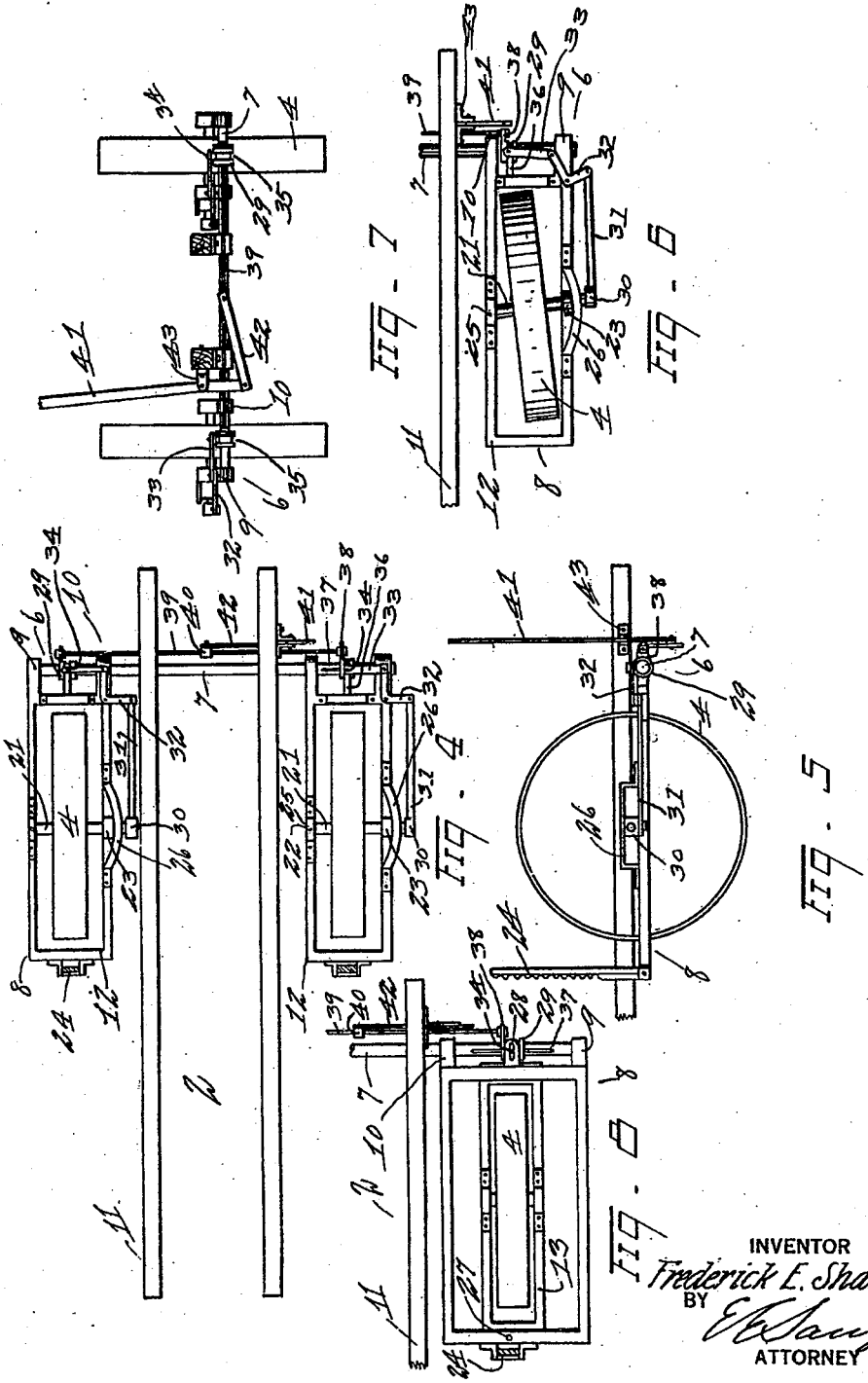

1,704,766

UNITED STATES PATENT OFFICE.

FREDERICK E. SHARP, OF PRESCOTT, WASHINGTON.

STEERING GEAR.

Application filed September 26, 1927. Serial No. 221,975.

This invention relates to steering devices for combined harvesters, or the like, and has as one of its objects to provide a steering device that may cooperate with the usual tiller wheel for steering purposes or that may be operated independently thereof.

Another object of the invention is to provide a steering device that will maintain the harvester in a position at variance with its line of draft.

A further object of the invention is to provide a steering device that will maintain the harvester in the grain and warp its movement to permit the horses to travel out of the grain even though the draft line is at an angle with the line of travel of the harvester.

A further object of the invention is to provide a steering device that will warp a harvester up a hill, overcoming its inclination to slide down the hill, and compensate for this slippage.

With these, and other objects in view, reference is now had to the accompanying drawings in which—

Fig. 1 is a side elevation of a harvester showing the location of the device thereon;

Fig. 2 is a detail in perspective of one form of wheel carrying frame;

Fig. 3 is a perspective view showing the journal blocks;

Fig. 4 is a plan view of the device showing its relative position with the leveling frames and the frame of the harvester;

Fig. 5 is a side elevation thereof;

Fig. 6 is a plan view of one of the leveling frames showing the warped position of its traction wheel;

Fig. 7 is the front elevation of the device; and

Fig. 8 is a plan view of a modified form of leveling frames.

Having reference to the drawings, like numerals refer to like parts throughout the several views and the numeral 1 refers to a combined harvester as shown, the harvester being intended as a typical representation of machinery used on side hill work and provided with leveling means.

The harvester consists in general of a frame 2, supported by a tiller wheel 3 and traction wheels 4 (the concentric circles representing said wheels), with a body 5 resting on and supported by the frame and forming the machine proper.

As machinery of this character is designed for side hill work, and as they must be kept level for efficient operation, it is obvious that certain forms of leveling devices must be resorted to for the purpose, and the forms shown herewith are typical and operate from a hinging means 6 consisting of a shaft 7, on which the rear end of a leveling frame 8 may be supported by means of rearwardly extending arms 9 and 10 respectively that are rockably mounted thereon for the purpose.

The shaft 7 may be extended from both sides of the machine, where both sides are leveled (illustrated in Fig. 4), or where only one side is leveled (as shown in Fig. 1) the shaft may only extend to that side. In either event, however, the shaft is preferably attached securely to the sills 11 of the frame for strength. Leveling "one side" or "both sides" of the machine is common parlance denoting that the machine is to be leveled by moving one or both traction wheels respectively up or down as occasion may require, the traction wheels being carried by leveling frames 8 which will now be described.

The frames 8 may consist of a single rectangle 12, as shown in Fig. 4, or contain a second or other rectangle 13, as shown in Fig. 8, or may consist of a yoke 14 having a forwardly extending member 15 hingedly engaging the shaft 7, and an upright 16 attached to and supported by the said member 15; a diagonal member 17 joining the top end of the upright 16 with the yoke 14 and a curved rack 18 similarly attached to the upright 16 and, passing downward over a pinion 19, connecting with a socket member 20, and an axle 21 joining the socket member 20 and the yoke 14 through the medium of a pivotal journal 22 and a sliding journal 23, as shown in Fig. 2, with the traction wheel 4 mounted on the axle in the usual manner, not shown.

Obviously rotating the pinion 19, by any suitable means, will raise or lower the leveling frames 18 and thus level the machine.

In the leveling frames leveling is accomplished by means of the usual straight rack 24, shown in Figs. 4, 5 and 8, and the rack is operated in a similar manner to that just described, and by the usual pinion (not shown).

Warping is accomplished by moving either one or both traction wheels 4 simultaneously in a horizontal plane, and the pivotal point 25 may be established in the journals (see Fig. 6), while the sliding journal 23 is slidably mounted in a saddle 26 suitably formed in conjunction with the frame 8.

Where a double rectangle is provided the second or wheel bearing frame 13 is secured to the outer frame by a pivot 27 at the forward end of the frame, and the rear end has a protecting tongue 28 extended rearwardly to engage a collar 29 to be explained.

In the latter case the leveling frame is divided to receive and support the projecting parts of the wheel bearing frames, in the usual manner of such construction.

This construction is not shown as it is old in the art and is therefore deemed unnecessary.

In warping, the relative position of the traction wheel 4 and leveling frames 8 is changed, and the wheel is moved in a horizontal plane to positions as shown in Fig. 6. To accomplish this movement of the wheel, the above mentioned collar 29 is slidably mounted on the shaft 7 while the end of the axle is extended through the sliding journal 23 and carries a block 30 loosely attached thereto, and to which is suitably attached a link 31, having its opposite end pivotally attached to a bell crank 32, the latter of which is pivotally mounted on the leveling frame, while a second link 33 connects the operating arm of the bell crank with a pin 34 adapted to seat in the slot 35 of said collar 29.

By this arrangement the movement of the bell crank and links incident to the movement of the leveling frame to which they are attached, does not effect the operation of the device as the pin will follow the slot in the collar during this movement.

A tongue 36 is slidably mounted in the frame 8 and connected to the pin 34 to maintain the relative position of the pin and leveling frame.

The collar is secured against rotation by a feather key 37 and has a rearwardly extending clip 38 to which is adjustably secured a tie rod 39, the latter connecting both collars where two collars are used, or at least extended inwardly to provide for flexibility in the rod whereby the operating movement of the wheels (one up and one down) would not materially effect this operation.

The tie rod 39 carries a clip 40 and provides for a flexible connection between the tie rod and an operating lever 41, in the nature of a link 42.

The operating lever is pivotally mounted on the frame of the machine by supports 43 and is positioned for convenient operation. While the operating lever is adapted for manual operation it is obvious that the tie rod may be operated by mechanical means if desired.

In use the device is attached to the harvester and the wheels are warped according to the work in hand.

In cutting grain the grain cutting header of the harvester is normally on the right side of the machine and in the grain, and to keep the grain cutting mechanism in the grain it was originally necessary to incline the draft of the horses into the edge of the grain thus causing much loss by trampling from the horses.

Then on side hill work there was a tendency for the machine to slip down hill, necessitating a greater inclination in the line of draft, into the grain to compensate for the slippage, with a corresponding greater loss of grain.

By warping the wheels then the horses may be kept out of the grain and traction wheels are made to hold the harvester in a proper position for efficient operation without the losses stated.

Having thus described my invention, I claim:

1. In a steering device for combined harvesters, having levelable frames attached to said harvester for independent vertical movement, traction wheels carried by said frames and rotatably mounted in said frames and adapted for rotative movement in a horizontal plane, and means to simultaneously move said wheels in a horizontal plane.

2. In a steering device for combined harvesters, the combination with a hinging means attached to said harvester, and a levelable frame mounted on said hinging means, of movable journals carried by said frame, traction wheels rotatably and pivotally mounted in said journals, and means carried by said hinging means to change the relative position of said wheel and said frame.

3. In a steering device for combined harvesters, the combination with hinging means attached to said harvester, and levelable means mounted on said hinging means, of movable journals carried by each of said frames, a traction wheel positioned in each of said frames and rotatably and pivotally mounted in said journals, and a steering means carried by said hinging means and adapted to change the relative position of said wheels in said frames.

4. In a steering device for combined harvesters, the combination with hinging means attached to said harvester, and levelable frames mounted on said hinging means, of movable journals carried by each of said frames, a traction wheel positined in each of said frames and rotatably and pivotally mounted in said journals, and means carried by said hinging means to simultaneously change the relative position of said wheels and said frame.

5. In a steering device for combined harvesters, the combination with hinging means attached to said harvester, and levelable frames mounted on said hinging means, of movable journals carried by each of said frames, a traction wheel positioned in each of said frames and rotatably and pivotally mounted in said journals, and means carried by said hinging means to simultaneously change the relative position of said wheels and said frames, said means comprising collars slidably mounted on said hinging means and operably connected with each of said traction wheels, and means to operate said collars on said hinging means to move said collars in a horizontal plane.

6. In a steering device for combined harvesters, the combination with hinging means attached to said harvester, and levelable frames mounted on said hinging means, of traction wheels rotatably mounted in said frames and adapted for rotative movement in a horizontal plane, means carried by said hinging means and adapted to move said wheels in a horizontal plane simultaneous, said means comprising collars slidably mounted on said hinging means, bell cranks pivotally attached to said frame and links pivotally attached to and movable slidably with said collars and said wheels, and means for slidably moving said collars.

7. In a steering device for combined harvesters, the combination with hinging means attached to said harvester, and levelable frames mounted on said hinging means, of traction wheels rotatably mounted in said frames and adapted for rotative movement in a horizontal plane, means carried by said hinging means and adapted to move said wheels in a horizontal plane simultaneous, said means comprising collars slidably mounted on said hinging means, bell cranks pivotally attached to said frame, and links pivotally attached to and movable slidably with said collars and said wheels, a tie rod rigidly and adjustably attached to said collars, and slidably mounted in guides carried by said frames, means for slidably operating said tie rod, and a flexible connection connecting said tie rod and said operating means.

In testimony whereof I affix my signature.

FREDERICK E. SHARP.